US006362768B1

(12) United States Patent
Younis et al.

(10) Patent No.: US 6,362,768 B1
(45) Date of Patent: Mar. 26, 2002

(54) ARCHITECTURE FOR AN INPUT AND OUTPUT DEVICE CAPABLE OF HANDLING VARIOUS SIGNAL CHARACTERISTICS

(75) Inventors: Mohamed F. Younis; James Wolter Ernst, both of Columbia, MD (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/481,585

(22) Filed: Jan. 12, 2000

Related U.S. Application Data

(60) Provisional application No. 60/147,839, filed on Aug. 9, 1999.

(51) Int. Cl.[7] .................................................. H03M 1/12
(52) U.S. Cl. ........................ 341/155; 341/120; 341/144
(58) Field of Search ................................. 341/155, 110, 341/144, 120, 116, 118, 156, 145, 141, 126; 716/17; 381/107

(56) References Cited

U.S. PATENT DOCUMENTS

| | | | |
|---|---|---|---|
| 5,539,919 A | | 7/1996 | Naoe ........................... 395/856 |
| 5,546,079 A | | 8/1996 | Wagner .................. 340/870.39 |
| 5,583,731 A | | 12/1996 | Pergent et al. ................. 361/86 |
| 5,706,357 A | * | 1/1998 | Yang ........................... 381/107 |
| 6,081,215 A | * | 6/2000 | Kost et al. ................... 341/120 |
| 6,202,198 B1 | * | 3/2001 | Bibyk .......................... 716/17 |

* cited by examiner

Primary Examiner—Brian Young
Assistant Examiner—John B Nguyen
(74) Attorney, Agent, or Firm—Loria B. Yeadon

(57) ABSTRACT

An Input/Output device has programmable signal conditioning and signal control circuitry capable of receiving signals, scaling the received signals to a predetermined voltage range, determining signal type for each of the received signals, and controlling input/output circuitry of the programmable signal conditioning and signal control circuitry for accessing input signals and generating output signals. The I/O device further includes conversion circuitry for receiving the output signals and converting the output signals from analog to digital to enable these signals to be digitally processed, and also receives digitally processed signals, converts the digitally processed signals to analog signals, and transmits the analog signals as input signals to the programmable signal conditioning and signal control circuitry. Bus interface logic circuitry coupled to the programmable signal conditioning and signal control circuitry for interfacing the I/O device with a bus for transferring information to and from the I/O device is also included. The I/O device may be provided with high current and/or voltage conditioning circuitry for conditioning the signals within current and voltage ranges which are tolerable to microelectronics of the programmable signal conditioning and signal control circuitry; and signal specific conditioning circuitry for conditioning the signals to match the electrical characteristics of the programmable signal conditioning and signal control circuitry.

16 Claims, 4 Drawing Sheets

ARCHITECTURE FOR AN INPUT AND OUTPUT DEVICE CAPABLE OF HANDLING VARIOUS SIGNAL CHARACTERISTICS

PRIORITY

This application claims priority to a provisional patent application filed by Younis et al. on Aug. 9, 1999 and assigned U.S. Provisional Application No. 60/147,839, the contents of which are incorporated herein by reference.

FIELD OF THE INVENTION

The invention relates generally to architecture of an input and output device, and more particularly, to architecture of an input and output device capable of handling signal characteristics among different control system applications.

BACKGROUND OF THE INVENTION

Typically handling of input and output (I/O) is one of the most complex and costly parts of a control system. As signal characteristics vary significantly among different applications, the handling of the signals becomes unique to the application. For example, in aerospace applications, the I/O design tends not to be portable among different aircraft, or even among the different control units on the same aircraft. With the need for a new I/O design for each control unit, the handling of I/O becomes a major cost factor.

Additionally, since such diverse designs do not allow reuse of I/O designs across multiple applications, additional costs are imposed in the purchase of many types of chipsets and components in the development and testing of new I/O designs. Further, costs are also imposed due to a need for interfacing hardware to interface the new I/O designs with various signals and data buses, as well as due to the volume and weight of I/O subsystems, since more power is needed to run the subsystems and more fuel is required to lift the subsystems of an aircraft.

Accordingly, there is a need for architecture for an I/O unit which interfaces various signals and data buses so the same I/O unit design can fit different applications without requiring interfacing hardware.

Additionally, there is a need for architecture for an I/O unit which integrates multiple functions, such as processing a large number of signals, performing signal conditioning and filtering for a large range of signals, and conducting analog and digital conversion, to reduce volume and weight of the I/O subsystems and achieve miniaturization.

SUMMARY OF THE INVENTION

The present invention provides a novel architecture for an I/O unit capable of handling the I/O of analog and discrete signals in various applications, such as control systems for aircraft. The present I/O device can standardize the I/O hardware for aircraft and thus, significantly reduce the cost, weight and volume for the aircraft system. Miniaturization is achieved by integrating multiple functions and by using state-of-the-art chip technology to employ mixed signal design for the implementation of the I/O device. The I/O device is capable of processing a large number of signals, performing signal conditioning and filtering for a large range of signals, and conducting analog and digital conversion.

The I/O device includes programmable signal conditioning and signal control circuitry for receiving signals, scaling the received signals to a predetermined voltage range, determining signal type for each of the received signals, and controlling input/output circuitry of the programmable signal conditioning and signal control circuitry for accessing input signals and generating output signals. The I/O device further includes conversion circuitry for receiving the input signals and converting these signals from analog to digital to enable the output signals to be digitally processed, and also receives digitally processed signals, converts the digitally processed signals to analog signals, and transmits the analog signals as output signals to the programmable signal conditioning and signal control circuitry. Bus interface logic circuitry coupled to the programmable signal conditioning and signal control circuitry for interfacing the I/O device with a bus for transferring information to and from the I/O device is also included.

High current and/or voltage conditioning circuitry for conditioning the signals within current and voltage ranges which are tolerable to microelectronics of the programmable signal conditioning and signal control circuitry may also be provided, as well as signal specific conditioning circuitry for conditioning the signals to match the electrical characteristics of the programmable signal conditioning and signal control circuitry.

DETAILED DESCRIPTION OF THE PREFERRED EMBODIMENTS

A. Conceptual Architecture

Figure 1:
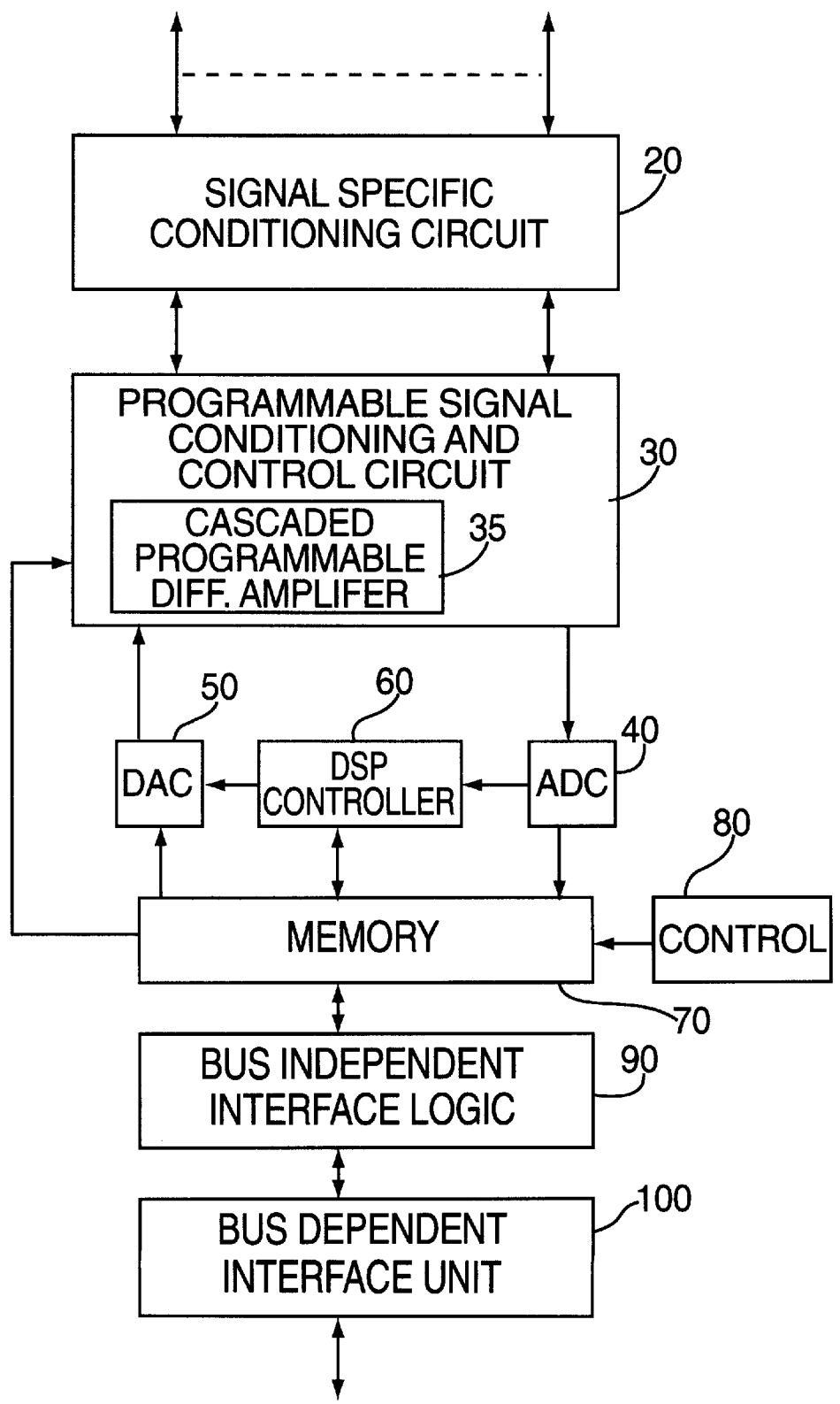
FIG. 1 is a block diagram of an I/O device according to the present invention.

In FIG. 1, there is illustrated a high-level functional block diagram of the architecture for an I/O device according to the present invention. The I/O device includes the following blocks: High Current and/or Voltage Signals and Signal Specific Conditioning block 20; Programmable Signal Conditioning and Signal Control block 30; Analog-to-Digital Conversion (ADC) and Digital-to-Analog Conversion blocks (DAC) 40 and 50; Digital Signal Processing (DSP) Controller block 60; Memory and Control blocks 70 and 80; Bus Independent Interface Logic block 90; and Bus Dependent Interface Unit block 100.

Block 20 pre-conditions the large signals to within a tolerable range and creates the correct matching characteristic of the signal. It should be noted that if the voltage and current of the signal are within tolerance for a microelectronic chip, such as a CMOS chip, this block is not necessary and is not included. Block 20 includes the following sub-blocks, not shown: High Current and/or Voltage sub-block and Signal Specific Conditioning sub-block.

The High Current and/or Voltage sub-block scales any high voltage signal to within a tolerable range. This sub-block converts the extreme signal conditions to within the signal range of the CMOS chip utilized in this specific illustrative embodiment of the present invention. The Signal Specific Conditioning sub-block matches any signal with a specific termination resistance. Also, any special circuit structure, such as a wheat-stone bridge, is constructed by this sub-block.

Block 30, as shown by FIG. 1, receives all the high voltage signals that have been scaled to within a reasonable range. However, it also receives some small signals which are still not within the full range of the ADC 40 or DAC 50. Further, there is no control over the DAC 50 driving a potential input. Block 30 addresses both issues and is configurable to handle both discrete and analog signals. In addition, the signal interface can be configured for both input and output, i.e., bi-directional. Block 30 includes two sub-blocks: Programmable Signal Conditioning sub-block including cascaded programmable amplifiers and Signal Control sub-block, not shown.

The Programmable Signal Conditioning sub-block is programmable to handle differential or single-ended signals and scales them to the full range of ADC 40 or DAC 50. The scaling step produces the maximum resolution for a number of signal ranges using a single range converter. The Signal Control sub-block enables or disables the output driver of a signal. If a signal has been programmed as input, then DAC 50 output must be disabled or blocked. ADC 40 does not have to be disabled, even when the signal is programmed as output. Although it is never disabled, ADC 40 should have the programmability to select inputs other than the signal to which it is mapped (e.g., a calibration or a test signal).

ADC 40 and DAC 50 convert the analog signals into and out of the digital realm, respectively. These blocks can be implemented through a number of converters, each multiplexed to a subset of signals; or there can be one converter implemented for each signal. In any case, it is preferable to have an overall sampling or refresh rate for each signal.

DSP Controller block 60 is optional and can be pushed to whatever processor or controller is at the other end of the bus. Block 60 is where all digital filtering and manipulation take place as described in detail below. With a sufficient overall refresh rate, it can digitize an analog frequency component (LVDT or RVDT) and convert it to a meaningful value. Having block 60 enables manipulation of time critical information efficiently and reduces traffic over the system bus. It is herein assumed a DSP Controller is integrated within the I/O device of the present invention.

Blocks 70 and 80 handle the mapping of the internal registers of ADC 40, DAC 50 and Signal Conditioning and Control blocks 20 and 30 into an appropriate memory map. The mapping allows reconfiguration and access to I/O data registers. Blocks 70 and 80 could be merged with either the Bus Independent Interface Logic block 90 or the DSP Controller block 60. Blocks 70 and 80 also serve as a placeholder for any support logic needed to keep the DSP Controller block 60 performing optimally, e.g., a sequencer to upload the data from ADC 40 to memory 70. Memory block 70 advantageously comprises control circuitry and registers.

The Bus Independent Interface Logic block 90 outlines the protocol to be used to interface with the Bus Dependent Interface Unit block 100. Block 90 could be a proprietary bus interface or a bridge to a daughter board interface (e.g., a PCI bridge for a PMC interface). Block 100 links the I/O device to a controller or management computer. Block 100 translates between block 90 and whatever bus has been selected. It is contemplated that block 100 could be implemented as a permanent fixture with programmable logic for different protocols and interchangeable layers or as a separate entity to be "plugged into" the board, such as mezzanine or daughter boards (e.g., a PMC).

B. Detailed Design of the I/O Device

1. High Current and/or Voltage Signals and Signal Specific Conditioning

The function of block 20 is to buffer or condition within a reasonable bound the high voltage or high current signals before they can be transferred to the Programmable Signal Conditioning and Signal Control block 30. It is also contemplated that block 20 is equipped with specific circuit structures to enhance the signal or at least the data that it represents (such as, e.g., a wheatstone bridge), before the data is transmitted to block 30. A certain degree of customization is necessary for block 20.

2. Programmable Signal Conditioning and Signal Control

When the signals reach block 30, they are within a reasonable range, although some signals are still quite small. Further, there is a mix of analog and discrete signals, single-ended and differential, and input and output signals that all need to be sorted out and dealt with accordingly. There is no predefined location for any such class of signals within this block 30, although the implementation of this block 30 may impose a minor restriction on the placement of differential input signals. There is a maximum flexibility at this stage. Also, in passing these signals on to the next stage, this stage filters out the higher frequency noise and spikes. The approach calls for a high frequency roll-off and for lower frequencies to be filtered out digitally, if necessary.

a. Analog and Discrete Signals

It is important at this point to detail how the different analog and discrete signals are handled as a single-ended analog input. This is possible because the high current and/or voltage signals have been conditioned to "fit" within the range of the analog signals. Treating them differently would be redundant, use more area and thus increase cost. Handling the signals similarly has many benefits for the discrete signal, such as programmable hysteresis and programmable debounce. This will be explained more fully in the DSP Controller section below.

b. Single-Ended and Differential Signals

Since discrete signals have been classified as single-ended analog signals, there are really only two classes of signals, the single-ended and the differential signals. These need to be handled so that the differential signal keeps its integrity and the single-ended signal has a reference to its local ground. This section mainly deals with input signals, since, when used as an output, there is always a ground that can be referenced, or, if it is a true differential signal, two single-ended signals can be paired together with a common ground for good signal integrity.

Figure 2:
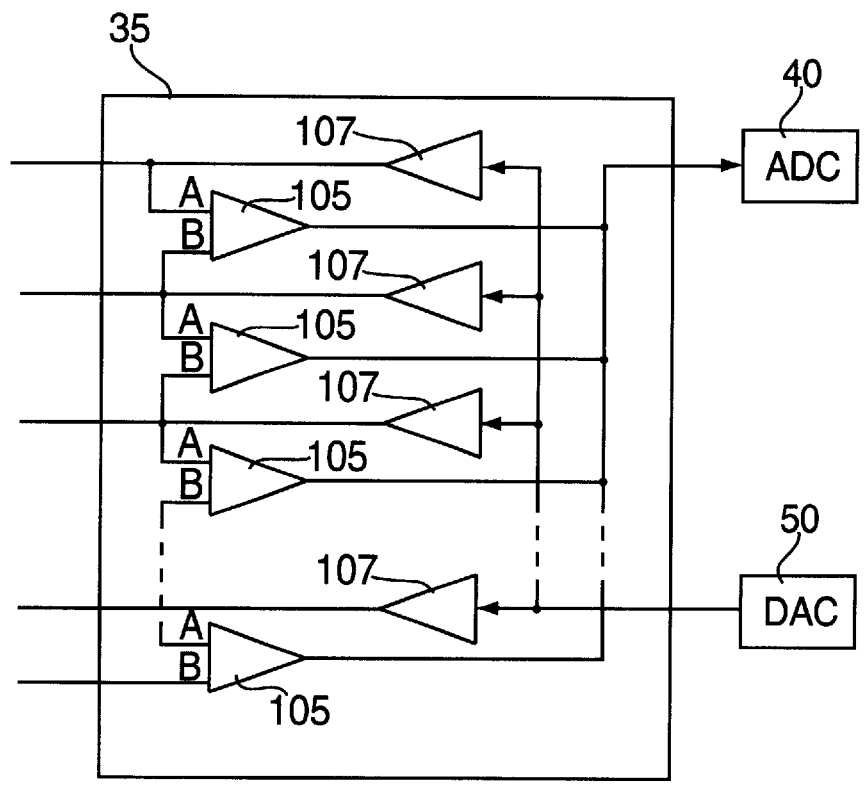
FIG. 2 is a schematic illustration of a subassembly of the programmable signal conditioning and control circuit in accordance with one specific illustrative embodiment of our invention.
Figure 3:
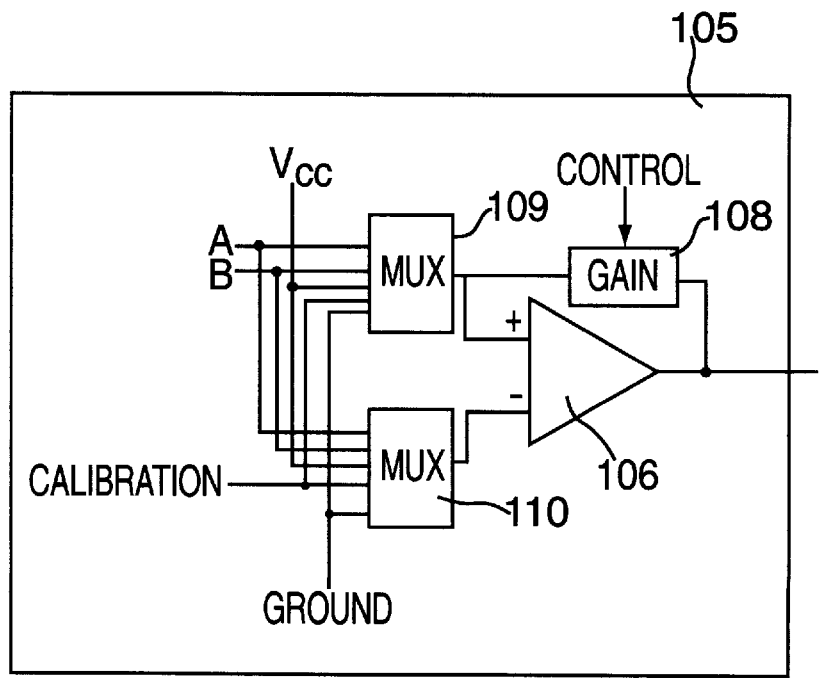
FIG. 3 is a schematic illustration of the programmable amplifier of the subassembly of FIG. 2.

The preferred design for the I/O device 10 of the present invention includes the cascaded programmable differential amplifiers or receivers 35 between every signal as shown in FIG. 2. As depicted in FIG. 2, the circuit 35 includes a plurality of differential amplifiers 105 to which the inputs are applied and output drivers or amplifiers 107 connected to the analog to digital and digital to analog circuits 40 and 50. Each of the differential amplifier circuits 105, in accordance with an aspect of our invention, comprises, as shown in FIG. 3, a differential amplifier 106, a feedback path including a gain circuit 108 to which a gain control signal is applied, and two multiplexers 109 and 110 to which a calibration signal, is applied and to which the A and B inputs are applied, as shown.

The programmability of the amplifier 35 will determine if the signal is differential or single-ended. If the signal is differential, then the inputs A and B are fed directly into the differential amplifier 105. If the signal is single-ended, then the signal is routed to the positive side of the receiver 105 and the negative side is routed to local ground. This programmability is attained, in accordance with our invention, by the inclusion of the multiplexers (MUX) 109 and 110 and the gain circuit 108, which are controlled by the control and calibration inputs.

The ability to route signals through the MUXs 109 and 110 in any order yields greater power and flexibility. For instance, A and B could be reversed at any time to detect any DC offset that may be present in the amplifier. This also relieves the restriction of having an order to the positive and negative signals from a differential signal. The only restriction left is that the signals must be adjacent to one another. Also, in the case where an amplifier may be unused, the power and ground signals, FIG. 3, may be routed with the appropriate gain in order to detect any brown out or spike in the power supply. The calibration signal also enables the system to be tested with a known voltage, or even a variable voltage, without disrupting the actual input signal.

c. Signal Sizes

Signals have a known upper bound to them, which is the upper bound of the capabilities of block 30. There are also signals that have an upper bound much smaller than the overall bound. Sampling these signals without amplifying them first would result in a loss of precision in the signal. This is also true when attempting to output small signals.

In order to compensate for this mismatch, there are programmable gains on the input and output amplifiers 106. Options for preset gains are available to input amplifier 105 to match the more popular signal ranges and scale them to the full range of ADC 40. Also, the inverses of these gains are available to the output drivers 107 to emulate the input and supply the excitation for such circuits, if needed. This allows thorough bench testing of the device by a digital loop-back, and opens up the ability of a thorough Built-In-Test (BIT) procedure.

d. Input and Output

The last variable to sort out is whether the signal is input or output. Although this is a fundamental and very critical characteristic of a signal, it is easily programmable in embodiments of our invention.

Putting an output driver 107 that has a tri-state function on each signal (FIG. 2) achieves programmable input or output. As mentioned previously, the input receivers or amplifier 105 need not be disconnected, even if a signal is classified as output. There is no interference incurred and, actually, it serves as an excellent approach for any loop-back BIT that would be implemented. The only problem that can occur is if a signal is classified as input and the output driver 107 is active. This is solved by the restriction that the output driver 107 have "tri-state" or "High-Z" capability. This way, if a signal is classified as input, the driver 107 can be "turned off" and not interfere with the input measurement.

All configuration or control information would come from the Memory and Control functional blocks 70 and 80 and thus appropriately configure each signal as input or output and also utilize the full range of either ADC 40 or DAC 50.

3. ADC and DAC

ADC 40 and DAC 50 are critical parts of the I/O device 10. The granularity must be very fine to acquire the precision outlined in the application requirements. All conversions must be fast in order to meet the timing goals and refresh rates also mandated by the performance goals. The implementation could be handled a number of ways. Usually multiple signals are multiplexed per each ADC or DAC. The number of ADC (or DAC) depends on the number of input (output) signals and the multiplexing ratio.

4. DSP Controller

DSP Controller block 60 digitally processes the signals. Some examples of the types of processing that can be performed are below.

a. Discrete Signals Manipulation

In the discrete realm, signals are either on or off. However, discrete signals need to be shaped and filtered, by DSP Controller block 60, which is able to do so since the discrete signals are treated as single-ended analog signals.

i. Slew Rate

Instead of turning a signal on 100%, signals can reach their intended value at a set rate. The signal can have a slew characteristic to it. This is realized by stepping the DAC 50 from an initial state, at whatever rate needed, to a destination state and leaving it there. This avoids ground bounce and overshoot.

ii. Level Variation

By characterizing a discrete signal as an analog entity, there is the ability to set levels and thresholds. This is valuable when specifying CMOS or TTL logic levels for input or output, and allows for hysteresis for signals by not reporting them on or off until they have passed certain programmable levels.

iii. Pulse Width Modulation (PWM)

Pulse Width Modulation is also very flexible when using DSP 60. Signals can be turned and modulated at almost any frequency or rate (depending on refresh and inherent slew rates). Power percentages are achieved easily using many different methods and frequencies. Also, the pulse can be slightly slewed, as described above, if needed.

iv. Filtering (Debounce)

Programmable debouncing is also an option when using DSP 60. A discrete signal may not be reported to a certain state until after the signal has maintained a certain value, using level detection, for a programmed amount of time. This feature is also limited to the number of samples per second that ADC 40 can function. If the sampling rate is high, then there is more precision available for debounce times.

b. Analog Signals Manipulation

The primary function of DSP 60 is to process analog signals, mainly to filter them, as explained below.

i. Filtering

Almost every sort of real filter can be implemented. There are algorithms for High pass, Low pass, and Band pass filters. There are also Infinite Impulse Response (IIR) and Finite Impulse Response (FIR) filters. DC offsets can be calculated and eliminated or simply added. The Fast Fourier Transform can be applied to the data stream, if necessary. Filters are the largest and most obvious use for DSP 60.

ii. Phase and Frequency Information

Obtaining the frequency and/or the phase of a signal is relatively straightforward; there are many different algorithms and approaches. To calculate the frequency of a signal, the zero crossings need to be calculated with the sampling rate. By counting the number of samples between two positive-to-negative zero crossings and accounting for the sample time, the frequency is easily calculated. Averaging this value within a time window results in a very accurate frequency calculation. If a more precise measurement is needed, then linear interpolation can be used between the two points of the zero cross to find the exact crossing time.

Phase of one signal to a given reference can be calculated similarly. Given (or having calculated) a set frequency, the phase of another signal in comparison can be calculated by finding the difference of the zero crossings and calculating that with the period to find the phase. Again, more precise calculations can be implemented by linear interpolation of the zero crossing. It should be noted that both of these techniques assume the signal's data stream has been properly filtered and that there is only one zero crossing and not multiple due to noise. That is why filtering is a crucial function of the DSP Controller block 60.

iii. Complex Calculations

DSP 60 processes the discrete and analog signals, and performs many more functions autonomously without passing the information on to the processor at the other end of the Bus Dependent Interface Unit block 100. DSP 60 can implement a frequency to voltage converter or voltage to frequency converter. Algorithms exist for LVDT or RVDT excitation and position calculation that can be implemented on DSP 60. Signals can also be added, averaged, and voted (mid value theorem).

5. Memory and Control

The Memory and Control blocks 70 and 80 may advantageously be integrated into DSP 60. Their main functions are to move data between ADC 40 and DAC 50, DSP 60 and the Bus Independent Interface Logic block 90. This allows the user to customize the memory map and can create simple "input" and "output" memory locations for DSP 60. These functions may be integrated into another block, such as DSP 60. Blocks 70 and 80 also represent any additional memory needed for DSP 60 or any other needed glue logic.

6. Bus Independent Interface Logic

It is preferable that the functionality of the Bus Independent Interface Logic block 90 is not integrated with another singular entity. There may be more than one Block 90 with separate protocols to support more than one selected bus, such as VME and PCI. Although this is an implementation issue, it should not be viewed as a limiting factor.

Block 90 can be an abstract layer; i.e., it can be implemented as a programmable device or in software. In this layer all data transfers are wrapped into one singular protocol to communicate with the Bus Dependent Interface Unit block 100. In this way, regardless of what system bus is being interfaced to, the information will be transferred to block 100 in the same format. Thus, this layer hides the bus-specific interface details from the other components so that they do not have to be modified as a result of changing the bus. Block 90 creates a bound around the functionality of the I/O device 10 and provides a defined port to be bridged to a targeted bus.

7. Bus Dependent Interface Unit

The Bus Dependent Interface Unit block 100 is a controller that handles the bus communication protocol and may advantageously comprise programmable logic sub-block and a physical interface sub-block. The programmable logic translates the selected bus's protocol to a known interface protocol for transfer of information to and from block 90. Accordingly, the programmable I/O device of the present invention can be further used to host the bus controller logic.

Using a field programmable device, e.g. an FPGA, it is possible to reconfigure the unit for other system buses. There are multiple programmable devices available in the market that have the capacity and flexibility to host the logic of most of the common system buses and to be configured to generate the control signals expected by the bus-specific physical interface. Examples of system buses surveyed include IEEE 1394, ARINC 429, Fiber Channel and Mil-STD 1553B. The bus selection is usually application-dependent, however the architecture can be configured for the bus-of-choice by loading the bus logic on the programmable device.

C. Integration Possibilities

There are a few blocks that lend themselves to being merged with other function blocks. This section outlines an approach that includes two mergers. One implies an ASIC for signal conditioning and conversion and another simply accounts for logical control. Such integration is employed in the illustrative embodiment of our invention depicted in FIG. 4.

Figure 4:
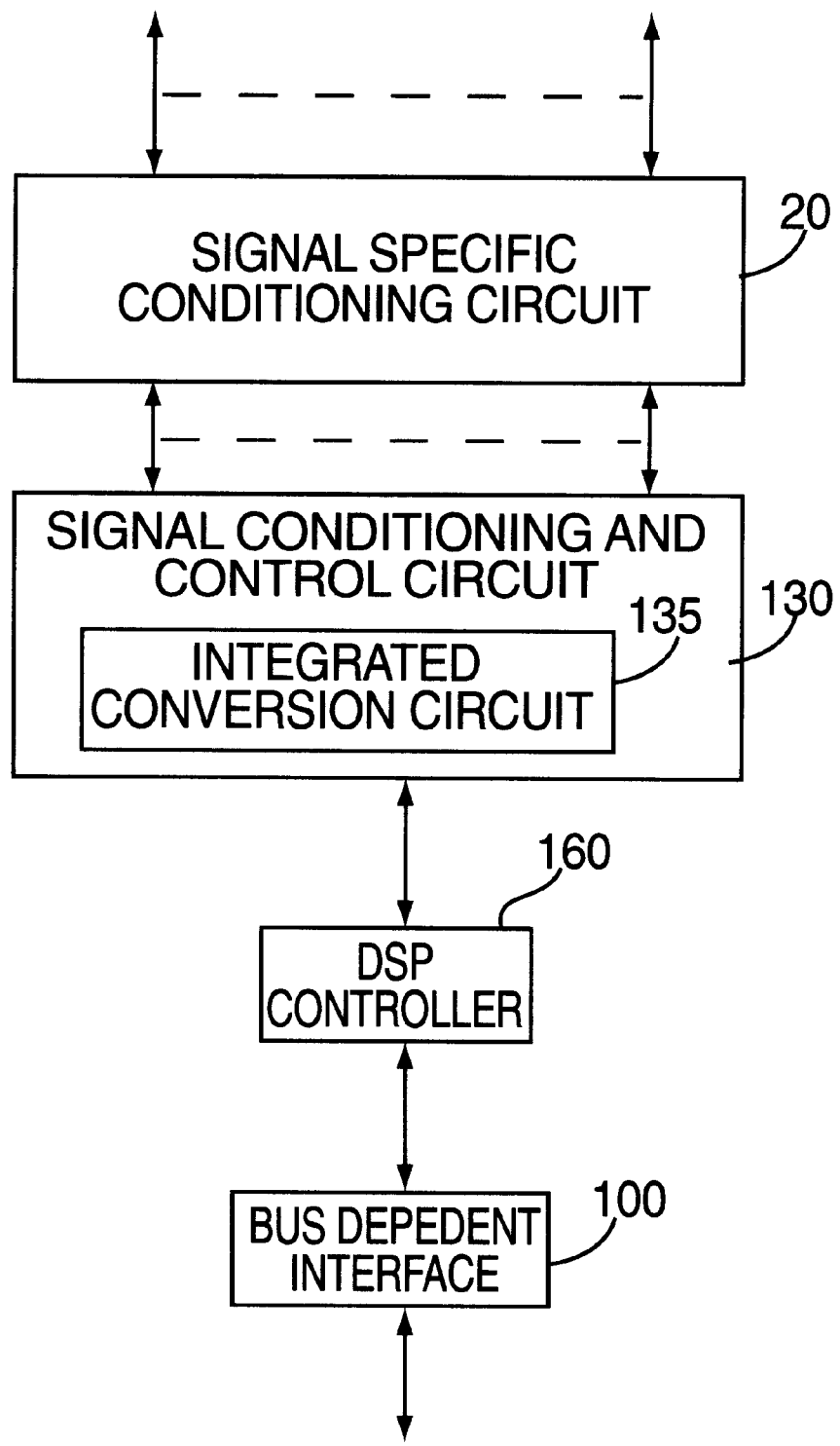
FIG. 4 is a block diagram of another illustrative embodiment of an I/O device according to the present invention.

Comparing FIG. 4 with FIG. 1, block 30 has been integrated with the ADC 40 and DAC 50 along with some of the functionality of blocks 70 and 80. The integration creates a new block, Signal Conditioning and Conversion 130 which includes an integrated conversion circuit or sub-block 135. In addition, the Bus Independent Interface Logic and the rest of the Memory Control have been merged with the DSP into a new Digital Signal Process or Block (DSP) 160.

1. Signal Conditioning and Conversion

Figure 5:
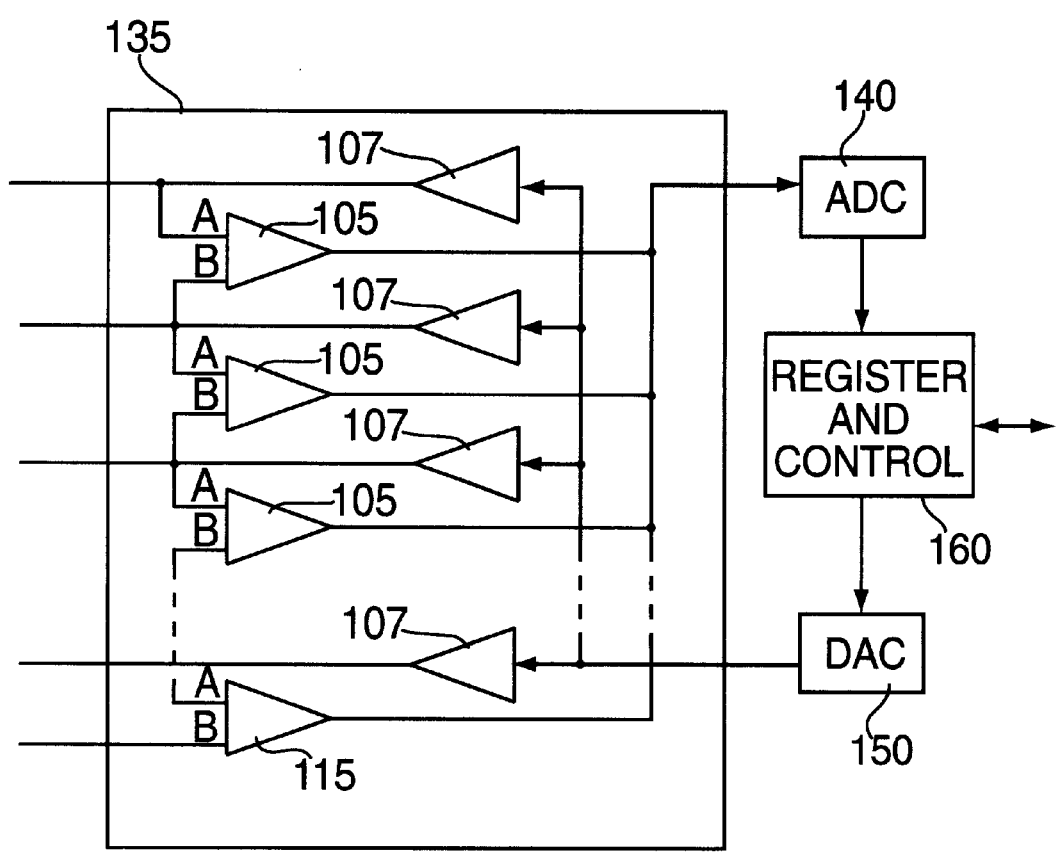
FIG. 5 is a schematic illustration of a signal conditioning and conversion chip for the embodiment of FIG. 4.

The integration done at this level is all on silicon. The approach puts the programmable drivers and receivers with ADC 40 and DAC 50 and various control logic on one chip for the integrated conversion circuit 135 as shown in FIG. 5. This design greatly reduces chip count, board space, and connectivity issues.

The chip provides a miniaturized and configurable approach for handling of input and output signals and combines both signal conditioning and conversion logic in a compact implementation. The chip is designed to handle multiple signals in any combination of discrete and analog, input or output and single-ended and differential from a few millivolts to a significantly higher voltage (e.g. 10 volts). It is empowered with a programmable-gain operational amplifier to scale the signal to a supported internal range while maintaining signal integrity and accuracy.

Logic of ADC 140 and DAC 150 is included on the chip. The interface to the chip from the board side is completely in digital format. Reading a set of registers from a register and control block 160 accesses samples of input signals and writing to these registers generates output signals. ADC 140 and DAC 150 support a 12-bit precision at a high sampling rate. The chip of FIG. 5 can be provided with a full loop-back test to support board-level BIT for performing diagnostics and integrity checks. The chip is designed to perform, given the right packaging, within harsh environment.

2. Enhanced DSP Controller

DSP 160 in this embodiment now incorporates the Memory Control and the Bus Independent Interface Logic functions. By merging these functions, there is no need to completely segment the functions to separate lines of code or separate controller chips.

It should be noted that, although the integration of the Signal Conditioning and Conversion was all done in silicon, the integration of DSP, Memory Control and the Bus Independent Interface Logic functions is purely functional and may still require multiple chips to fulfill. A separate programmable logic device and external or dual port memory may be needed to perform these functions; although, these functions may be integrated on the DSP chip itself.

While the present invention has been described in detail with reference to the specific embodiments, they are mere exemplary applications. Thus, it is to be clearly understood that many variations can be made by anyone skilled in the art within the scope and spirit of the present invention as defined by the claims.

What is claimed is:

1. An Input/Output device comprising:

an input/output port;

programmable signal conditioning and signal control circuitry for receiving both discrete and analog signals, for scaling said received signals to a predetermined voltage range, for determining signal type for each of said received signals, and for controlling input/output circuitry of said programmable signal conditioning and control circuitry for accessing input signals and generating output signals, said input/output circuitry including a plurality of registers;

conversion circuitry for receiving said output signals and converting said output signals from analog to digital to enable said output signals to be digitally processed, said conversion circuitry further receiving digitally processed signals, converting said digitally processed signals to analog signals, and transmitting said analog signals as input signals to said programmable signal conditioning and signal control circuitry; and bus interface logic circuitry for transferring information to and from said input/output port; and wherein reading said registers accesses said digitally processed signals and writing to said registers generates said output signals to be digitally processed.

2. The device of claim 1, further comprising a conditioning circuit connected to said programmable signal conditioning and signal control circuit and comprising:

high current and/or voltage conditioning circuitry for conditioning said signals within current and voltage ranges which are tolerable to microelectronics of said programmable signal conditioning and signal control circuitry; and signal specific conditioning circuitry for conditioning said signals to match the electrical characteristics of said programmable signal conditioning and signal control circuitry.

3. The device of claim 2, wherein one of the electrical characteristics said signal specific conditioning circuitry conditions said signals to match is an impedance characteristic of said Input/Output device.

4. The device of claim 1, wherein said signal conditioning and signal control circuitry includes a plurality of cascaded programmable differential amplifiers.

5. The device of claim 4, wherein said signals are fed directly to inputs of said plurality of cascaded programmable differential amplifiers if said signals are determined to be differential by said means for determining signal type.

6. An Input/Output device comprising:

programmable signal condition and signal control circuitry for receiving signals, for scaling said received signals to a predetermined voltage range, for determining signal type for each of said received signals, and for controlling input/output circuitry of said programmable signal conditioning and signal control circuitry for accessing input signals and generating output signals, said signal conditioning and signal control circuitry further including a plurality of cascaded differential amplifiers;

conversion circuitry for receiving said output signals and converting said output signals from analog to digital to enable said output signals to be digitally processed, said conversion circuitry further receiving digitally processed signals, converting said digitally processed signals to analog signals, and transmitting said analog signals as input signals to said programmable signal conditioning and signal control circuitry; and bus interface logic circuitry for transferring information to and from and Input/Output device; and wherein said received signals are fed directly to inputs of said plurality of cascaded programmable differential amplifiers if said signals are determined to be differential by said means for determining signal type, said received signals being routed to a positive side of said plurality of cascaded differential amplifiers if said received signals are determined to be positive single-ended signals and said received signals being routed to a ground of said plurality of cascaded differential amplifiers if said received signals are determined to be negative single-ended signals by said means for determining signal type.

7. The device of claim 6, further comprising memory control circuitry and wherein each of said plurality of cascaded programmable differential amplifiers includes a control input for receiving logic control information from said memory control circuitry for determining the type of received signals and routing said signals accordingly.

8. The device of claim 4, wherein inputs of said plurality of cascaded programmable differential amplifiers are coupled to multiplexers for multiplexing said received signals before routing said received signals to said differential amplifiers.

9. An Input/Output device comprising:

programmable signal conditioning and signal control circuitry for receiving signals, for scaling said received signals to a predetermined voltage range, for determining signal type for each of said received signals, and for controlling input/output circuitry of said programmable signal conditioning and signal control circuitry for accessing input signals and generating output signals, conversion circuitry for receiving said output signals and converting said output signals from analog to digital to enable said output signals to be digitally processed, said conversion circuitry further receiving digitally processed signals, converting said digitally processed signals to analog signals, and transmitting said analog signals as input signals to said programmable signal conditioning and signal control circuitry; and bus interface logic circuitry for transferring information to and from said Input/Output device; and wherein said signal conditioning and signal control circuitry includes a plurality of driver circuits coupled to said conversion circuitry for receiving signals from said conversion circuitry and a gain circuit providing a feedback path from an output to an input of each of said driver circuits.

10. The device of claim 9, wherein an input of said conversion circuitry is input to one of said plurality of driver circuits, an output of said one of said plurality of driver circuits is input to one of a plurality of cascaded programmable differential amplifiers, and an output of said one of said plurality of cascaded differential amplifiers is output to said conversion circuitry, wherein a feedback loop path is formed.

11. A signal conditioning and conversion circuit for an Input/Output device capable of scaling signals to a predetermined voltage range and determining signal type for each of said received signals, said signal conditioning and conversion circuit comprising:

a plurality of cascaded programmable differential amplifiers for receiving as inputs said received signals and providing a plurality of output signals;

analog-to-digital conversion circuitry for receiving said plurality of output signals and converting said signals from analog signals to digital signals;

memory control circuitry coupled to said analog-to-digital conversion circuitry for receiving said digital signals, generating digital output signals for output from said signal conditioning and conversion circuit to digital processing circuitry for digitally processing said digital output signals, and receiving said digitally processed signals;

digital-to-analog conversion circuitry coupled to said memory control circuitry for receiving said digitally processed signals and converting said digitally processed signals to analog signals; and;

a plurality of driver circuits for receiving as inputs said analog signals and providing a plurality of output signals to said plurality of cascaded programmable differential amplifiers;

wherein said plurality of programmable differential amplifiers, said analog-to-digital conversion circuitry, and said driver circuits form a feedback loop path, and wherein said received signals and said plurality of output signals from said plurality of driver circuits are routed to a positive side of said plurality of said cascaded differential amplifiers if said received signals and said plurality of output signals from said plurality of driver circuits are determined to be positive single-ended signals and said received signals and said plurality of output signals are routed to a ground of said plurality of cascaded differential amplifiers if said received signals and said plurality of output signals from said plurality of driver circuits are determined to be negative single-ended signals.

12. The device of claim 11, wherein said memory control circuitry includes a plurality of registers, wherein reading said registers accesses said digitally processed signals and writing to said registers generates said digital output signals to be digitally processed.

13. The device of claim 11, wherein said received signals and said plurality of output signals from said plurality of driver circuits are fed directly to inputs of said plurality of cascaded programmable differential amplifiers if said received signals and said plurality of output signals from said plurality of driver circuits are determined to be differential.

14. The device of claim 11, wherein each of said plurality of cascaded programmable differential amplifiers includes a control input for receiving logic control information for determining the type of said received signals and said plurality of output signals from said plurality of driver circuits and routing said signals accordingly.

15. The device of claim 11, wherein inputs of said plurality of cascaded programmable differential amplifiers are coupled to a multiplexer for multiplexing said received signals and said plurality of output signals from said plurality of driver circuits before routing said received signals and said plurality of output signals toward said inputs of said amplifiers.

16. A signal conditioning and conversion circuit for an Input/Output device capable of scaling signals to a predetermined voltage range and determining signal type for each of said received signals, said signal conditioning and conversion circuit comprising:

a plurality of cascaded programmable differential amplifiers for receiving as inputs said received signals and providing a plurality of output signals;

analog-to-digital conversion circuitry for receiving said plurality of output signals and converting said signals from analog signals to digital signals;

memory control circuitry coupled to said analog-to-digital conversion circuitry for receiving said digital signals, generating digital output signals for output from said signal conditioning and conversion circuit to digital processing circuitry for digitally processing said digital output signals, and receiving said digitally processed signals;

digital-to-analog conversion circuitry coupled to said memory control circuitry for receiving said digitally processed signals and converting said digitally processed signals to analog signals; and a plurality of driver circuits for receiving as inputs said analog signals and providing a plurality of output signals to said plurality of cascaded differential amplifiers;

wherein said plurality of cascaded programmable differential amplifiers, said analog-to-digital conversion circuitry, said memory control, circuitry, said digital-to-analog conversion circuitry and said plurality of driver circuits form a feedback path, and wherein at least one gain circuit is provided between an input and an output of each of said plurality of cascaded programmable amplifiers, said at least one gain circuit providing a feedback loop path from said input to said output of said signal conditioning and conversion circuit for sending a test signal therethrough for testing said signal conditioning and conversion circuit.

\* \* \* \* \*